United States Patent
Wölk et al.

(10) Patent No.: US 11,418,021 B2
(45) Date of Patent: Aug. 16, 2022

(54) DEVICE CIRCUIT BREAKER HAVING INTELLIGENT LIMIT VALUE DETERMINATION AND METHOD THEREFOR

(71) Applicant: PHOENIX CONTACT GMBH & CO. KG, Blomberg (DE)

(72) Inventors: Gerhard Wölk, Schieder-Schwalenberg (DE); Martin Striewe, Horn-Bad Meinberg (DE); Alexander Fomenko, Bielefeld (DE); Guido Nahles, Bad Lippspringe (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 0 days.

(21) Appl. No.: 17/257,779

(22) PCT Filed: Jul. 5, 2019

(86) PCT No.: PCT/EP2019/068063
§ 371 (c)(1),
(2) Date: Jan. 4, 2021

(87) PCT Pub. No.: WO2020/008019
PCT Pub. Date: Jan. 9, 2020

(65) Prior Publication Data
US 2021/0273441 A1 Sep. 2, 2021

(30) Foreign Application Priority Data
Jul. 5, 2018 (BE) .............................. BE2018/5471

(51) Int. Cl.
*H02H 3/00* (2006.01)
*H02H 3/093* (2006.01)
*H02H 1/00* (2006.01)

(52) U.S. Cl.
CPC .......... *H02H 3/093* (2013.01); *H02H 1/0007* (2013.01); *H02H 3/006* (2013.01)

(58) Field of Classification Search
None
See application file for complete search history.

(56) References Cited

U.S. PATENT DOCUMENTS

| | | | |
|---|---|---|---|
| 5,714,886 A * | 2/1998 | Harris | G01R 35/005 324/601 |
| 6,195,243 B1 | 2/2001 | Spencer et al. | |
| 2008/0111509 A1* | 5/2008 | Kunkel | H02H 7/0851 318/286 |

FOREIGN PATENT DOCUMENTS

| | | |
|---|---|---|
| DE | 102009048174 | 4/2011 |
| DE | 102016003738 | 10/2017 |
| EP | 2811604 | 12/2014 |

OTHER PUBLICATIONS

Official Action for Belgium Patent Application No. BE2018/5471, dated Mar. 6, 2019, 11 pages.
(Continued)

*Primary Examiner* — Stephen W Jackson
(74) *Attorney, Agent, or Firm* — Sheridan Ross P.C.

(57) ABSTRACT

The invention relates to a device circuit breaker having intelligent limit value determination. In a training phase, the device circuit breaker is adjusted to a specific device and its load behavior. In a subsequent monitoring phase—based on the values determined in the training phase—present values or values derived from those are compared and, if necessary, the current flow is interrupted.

13 Claims, 10 Drawing Sheets

(56) References Cited

OTHER PUBLICATIONS

International Search Report and Written Opinion for International (PCT) Patent Application No. PCT/EP2019/068063, dated Sep. 11, 2019, 11 pages.
English Translation of International Search Report for International (PCT) Patent Application No. PCT/EP2019/068063, dated Sep. 11, 2019, 2 pages.

* cited by examiner

DEVICE CIRCUIT BREAKER HAVING INTELLIGENT LIMIT VALUE DETERMINATION AND METHOD THEREFOR

CROSS REFERENCE TO RELATED APPLICATIONS

This application is a national stage application under 35 U.S.C. 371 and claims the benefit of PCT Application No. PCT/EP2019/068063 having an international filing date of 5 Jul. 2019, which designated the United States, which PCT application claimed the benefit of Belgium Patent Application No. BE2018/5471 filed 5 Jul. 2018, the disclosures of each of which are incorporated herein by reference in their entireties.

The invention relates to a device circuit breaker having limit value determination and method therefor.

BACKGROUND

Device circuit breakers are used in many areas of electrical systems technology. The object of these device circuit breakers is to protect downstream loads and their surroundings against an overcurrent and/or the effect of same. If such circuit breakers are not used and if there is an overcurrent, both the downstream load and other items can be directly or indirectly damaged. For example, an overload can cause fires in the downstream load or power lines.

A problem in this regard is that loads exhibit different current behavior. For instance, it is known that electric motors for example have high start-up currents, which may be significantly higher than the nominal currents. Likewise, certain loads, such as combinatorial circuit components, have high switch-on currents, which are used for charging a capacity. For instance, at the switch-on moment some loads require a current that corresponds to 5-7 times the nominal current. On the other hand, other loads have periods in which they execute a task and then take a break again.

To date, such system operators had to be advised to protect the nominal current at a correspondingly high value.

In some solutions relating to circuit breakers, the inertia of the switch-off can be adjusted.

However, the solutions to date only represent a compromise because the respective system operator must decide, by selecting the circuit breaker and thus its switching behavior, whether a malfunction could have arisen. However, the technical data relating to such permissible overcurrents are frequently unavailable; instead, only a continuous or nominal current is often mentioned.

This results in system operators often utilizing improperly dimensioned device circuit breakers, so that the actual protective purpose of the device circuit breaker only comes into play late—often too late.

Therefore, the object of the invention is to provide new concepts which make available device circuit breakers that allow the permissible current behavior and make available an improved switching behavior in the event of an overload.

The approaches to date are not intelligent, and their sensitivity is also reduced in relation to a short circuit to be switched off.

The object is achieved by means of a current sensor according to one of the independent claims. Additional advantageous embodiments of the invention are indicated in the dependent claims, the description and the drawings.

BRIEF DESCRIPTION OF THE DRAWINGS

The invention is explained in greater detail below using preferred embodiments with reference to the attached drawings.

Figure 1:
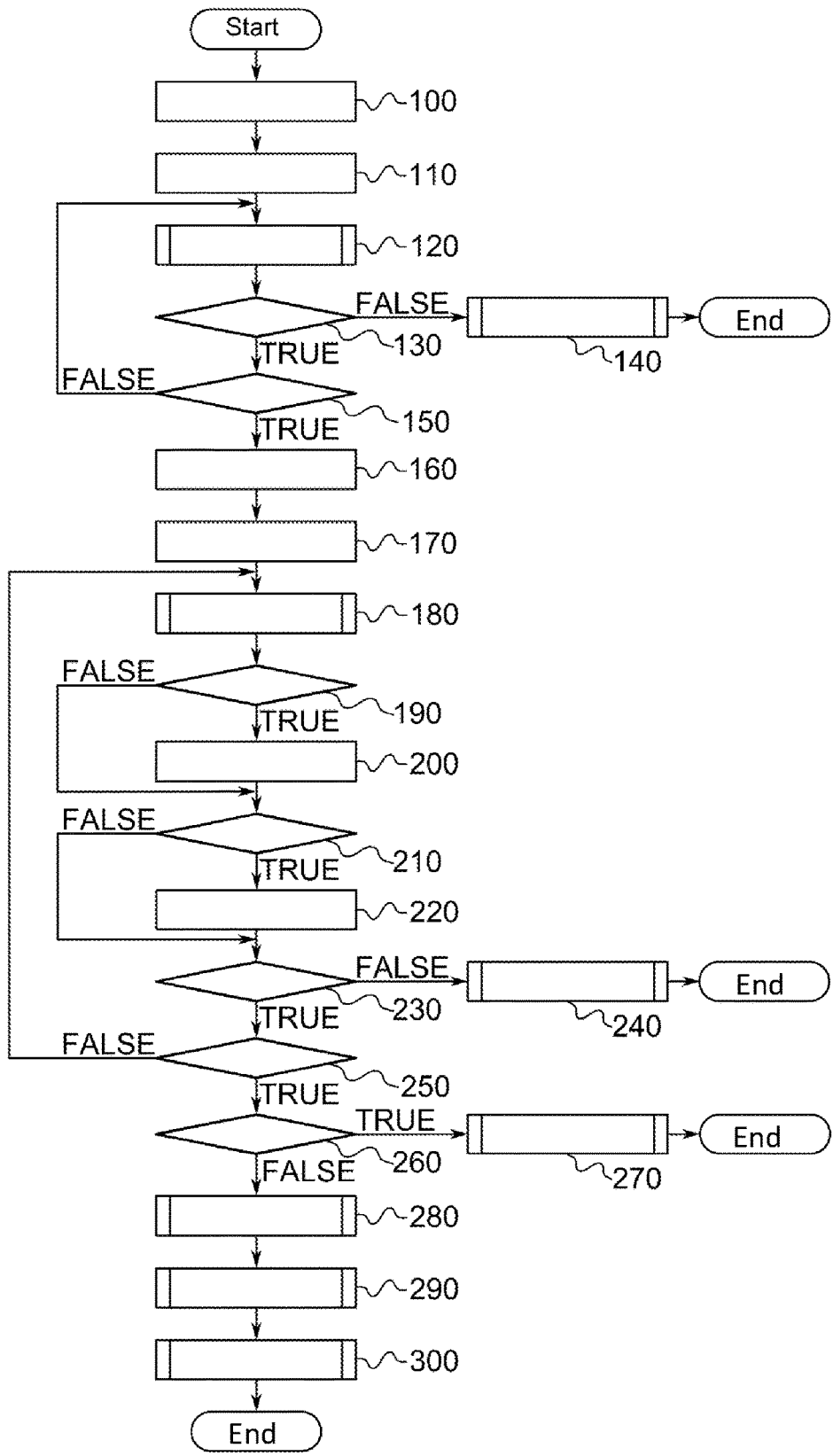
FIG. 1 shows a schematic flowchart of aspects according to an embodiment of the invention.

The invention will be described in greater detail below (with reference to the drawings). It should be noted that various aspects are described which can be used individually or in combination. This means that any given aspect can be used with various embodiments of the invention as long as it is not explicitly represented as a mere alternative.

Also, for simplicity's sake and as a rule, reference will always be made below to only one entity. However, unless noted otherwise, the invention may also have several of any of the entities in question. To that extent, the use of the words "a" and "an" are to be understood only as an indication that at least one entity is being used in a single embodiment.

To the extent that methods are described hereinafter, the individual steps of a method can be arranged and/or combined in any sequence as long as the context does not explicitly provide otherwise. Furthermore, the methods can be combined with one other unless expressly indicated otherwise.

As a rule, specifications having numerical values are not to be understood as exact values, but as having a tolerance of +/−1% to +/−10%.

References to standards or specifications or norms shall be understood to be references to standards or specifications or norms which are or were valid at the time of the application or—if a priority is claimed—at the time of the priority filing. However, this shall not be understood as a general exclusion of the applicability of subsequent or superseding standards or specifications or norms.

Hereinafter, "adjacent" explicitly includes a direct proximity relationship without, however, being limited to it, and "between" explicitly includes a position in which the intermediate part is in direct proximity to the surrounding parts.

A device circuit breaker 1 according to the invention having intelligent limit value determination has means for determining the current IM through the device circuit breaker 1. These means for determining the current IM may be executed for example as a voltage measurement at a resistor or as an inductive measurement and so on. These means for determining the current IM may provide the magnitude of the current in a suitable manner.

Below, we will assume that the measurement results are digitally processed, even though the invention is not limited to this.

Furthermore, the device circuit breaker 1 has a means for recording time CLK. For example, a digital clock, such as a clock signal or a quartz-controlled time signal or a signal derived from a mains voltage can be used as the base time. By means of a counter, a start or stop condition for example can then also be defined as a counting direction so that a time period can be counted up/down in a controlled manner on the basis of the count interval controlled by the base time.

Furthermore, the device circuit breaker may have a processing unit CPU, which controls corresponding processes. These processes may be permanently programmed or they may be programmed by a suitable wireless or wire-based interface 10. Remote signaling and/or remote querying and/or remote starting of the training phase and/or parameterization can also take place by means of the interface. The processing unit CPU may be a microcontroller or a microprocessor, for example.

The device circuit breaker 1 according to the invention has at least two operating modes.

A first operating mode is a so-called training phase. In the training phase, the device circuit breaker measures how long ($t_{train}$) a current larger than a certain lower limit value flows through the device circuit breaker 1 and thus through the connected device. This lower limit value may be assumed to be 1.3 $I_N$ (where $I_N$ is the nominal current), for example. However, the invention is not limited to this value. The training phase ends at the latest upon reaching a certain maximum training time $t_{max}$.

A maximum current $I_{train}$ flowing through the device circuit breaker and the connected device is determined during the training phase.

The second operating mode is a so-called monitoring phase. In the monitoring phase, the device circuit breaker 1 monitors the current flow through the device circuit breaker and the connected device, wherein, when the current flow exceeds the lower limit value, i.e., is above 1.3 $I_N$ for example, the current is compared to the determined maximum current $I_{train}$.

Upon reaching or exceeding the determined maximum current $I_{train}$ and/or upon reaching or exceeding the specific time $t_{train}$, the device circuit breaker 1 interrupts the current flow, e.g., by means of a switch S. The switch S may be suitably designed as an electromagnetic or electric switch (e.g., a semiconductor switch).

This means that in contrast to prior art, a training profile matched to the device is now used as a basis for making a decision about a malfunction. In this way, reliability is significantly increased, since improper dimensioning, as is known from the past, can no longer occur.

In other words, in the training phase, the device circuit breaker is trained to the device. For example, in the training phase, in a specified period $t_{konst}$, the peak current of the load and/or the period determines how long the current lies above the 1.3×the nominal current can be determined A maximum current and a maximum training time $t_{konst}$ can then be specified as limit values. If one of the limit values is exceeded, the training phase is terminated. The thereby-determined measurement values of peak current and/or maximum contact time is/are stored as the threshold(s) for the subsequent monitoring phase.

In one embodiment of the invention, the training phase ends upon reaching a certain upper limit value $I_{Max}$ of the current. This means that when the current output limit of the device circuit breaker is reached, a forced shutdown and thus also termination of the training phase can also occur for safety reasons.

In the monitoring phase, the current is monitored by the device circuit breaker. If the current rises above the previously determined threshold, e.g. above 1.3× the nominal current $I_N$, the current flow is scanned and compared to a stored threshold of peak current and maximum contact time. If it is found that these thresholds have been exceeded, the load is switched off.

An illustrative process is depicted in FIG. 1. The process begins at "Start." A training phase is now begun. First, in a step 100, a clock/timer is started. In step 110, the start time $t_a$ is stored as the current counter datum/timer datum and in step 120, the current through the device circuit breaker and the time of the counter are determined. In step 130, a check is performed as to whether the time of the ongoing training phase is still within the maximum training time $t_{konst}$.

If this is not the case (FALSE), the process can signal the end in an optional step 140 and thereupon end the process after the time has elapsed. Since no higher currents were measured in the training phase, it can be assumed that the nominal current was incorrectly selected or that no load was connected. This can be signaled for example in step 140 as an error code.

If the time of the ongoing training phase is still within the maximum training time $t_{konst}$ (TRUE), then a check is performed in step 150 as to whether the current through the device circuit breaker is greater than the specific lower limit value, e.g., 1.3*$I_N$.

If this is not the case (FALSE), the process can go back to step 130 and run through the additional steps again.

However, if the current through the device circuit breaker is greater than the specific lower limit value, e.g., 1.3*$I_N$, (TRUE), then in step 160 a flag can be stored for the current peak value. For example, the flag will be set to "0", since a prior peak current had not yet occurred. In a step 170, a flag $t_a$ can also be set for the start time of the training phase.

In an additional step 170, the current through the device circuit breaker and the time of the counter are determined (again).

In step 180, a check is now performed as to whether the last determined current through the device circuit breaker is greater than the flag for the current peak value. On a first run-through, this will always be the case so that in step 190, the value of the flag for the current peak value is replaced by the last determined current through the device circuit breaker. However, if in step 180 the last determined current through the device circuit breaker is not greater than the flag for the current peak value, step 190 can be skipped.

In the subsequent step 200, a comparison is now performed as to whether the last determined current through the device circuit breakers is greater than the specific lower limit value. In the event that the last determined current through the device circuit breaker is greater than the specific lower limit value, a flag to is stored in step 210 as the current counter datum/timer datum for the end point of the training phase. In the event that the last determined current through the device circuit breaker is not greater than the specific lower limit value, step 210 is skipped. Obviously, step 210 and the associated evaluation can also be incorporated at another point in the training process so that, for example, the comparison regarding the maximum current through the device circuit breaker is performed as the first comparison.

In a step 220, a comparison can now be performed as to whether the last determined current and/or the flag for the current peak value is smaller than the maximum current $I_{konst}$ through the device circuit breaker. If this is not the case, this can signal the end in an optional step 240 and thereby end the process by turning off the device circuit breaker. Since an excessively high current was already measured at the start of the training phase, it can be assumed that a successful start of the device circuit breaker is impossible, e.g., due to excessively low capacity of the device circuit breaker or due to a short circuit. This can be signaled as an error code for example in step 240.

However, if the last determined current and/or flag for the current peak value is less than the maximum current $I_{konst}$ through the device circuit breaker, the process can continue with step 250. In step 250, a check can be performed as to whether the time of the ongoing training phase is outside of the maximum training time $t_{konst}$.

If this is not the case (FALSE), the process returns to step 180.

If the time of the ongoing training phase lies outside of the maximum training time $t_{konst}$ (TRUE), then a check is performed in step 260 as to whether the current through the device circuit breaker is greater than the specific lower limit value, e.g., $1.3*I_N$.

If this is the case (TRUE), the process can signal the end in an optional step 270 and thereupon end the process. This can be signaled, for example, in step 270 as an error code. In this case, it must be assumed that during operation the device circuit breaker will be subjected to higher currents for too long and is therefore not suited for the load.

However, if this is not the case (FALSE), the training phase can go into the last stage. In step 280, the threshold for the peak current for a subsequent monitoring phase can be assigned the value of the flag for the peak current. In step 290, from the flag for the start time $t_a$ and the last saved flag for the end time $t_e$, a time difference can be determined as a threshold for the shut-off time for a subsequent monitoring phase. The successful termination of the training phase can be signaled in an optional step 300, by means of which the training process ends.

In the monitoring phase, monitoring is preferably performed (continuously) as to whether the current flowing through the device circuit breaker is greater than the maximum current of the device circuit breaker. If the current becomes larger, the device circuit breaker is switched off.

Figure 2:
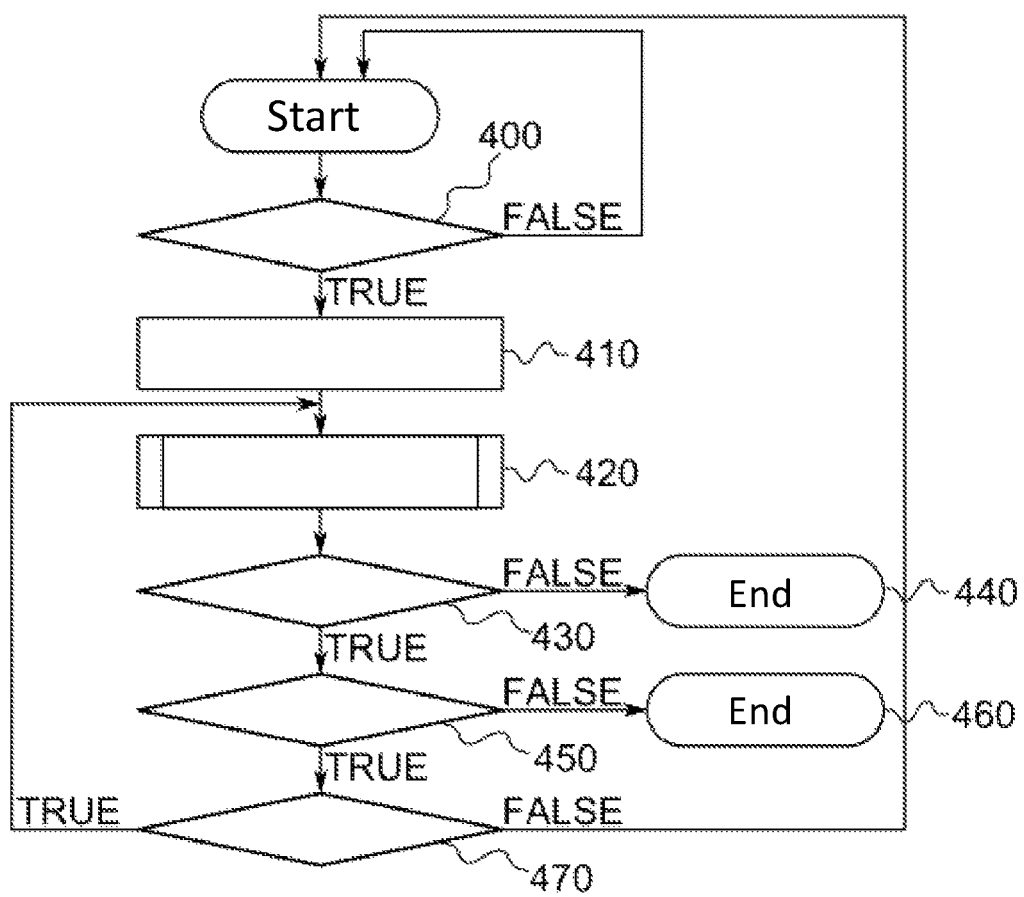
FIG. 2 shows a schematic flowchart of additional aspects according to an embodiment of the invention.

An illustrative process is shown in FIG. 2. The method begins at "Start." A monitoring phase is now started. In a step 400, in the monitoring phase, the last detected current through the device circuit breaker is compared to the specific lower limit value as well as to the previously determined threshold for the peak current. If the last determined current through the device circuit breaker is larger than the specific lower limit value, e.g., $1.3*I_N$, and smaller than the previously determined threshold for the peak current, i.e., an overcurrent is flowing, a timer is started/initialized in step 410. Otherwise, the process reverts back to step 400.

Chronologically after step 410, the current is measured in step 420 and the timer is determined. In step 430, a comparison is performed as to whether the timer lies under the threshold for the switch-off time. If this is not the case (FALSE), the process ends (step 440). However, if the timer is below the threshold for the switch-off time (TRUE), a check is performed in step 450 as to whether the last measured current is less than the threshold for the peak current. If this is not the case (FALSE), the process ends and may optionally signal a detected short circuit (step 460).

However, if the last measured current is less than the threshold for the peak current (TRUE), a check is now performed in a step 470 as to whether the last measured current is greater than the specific lower limit value, e.g., $1.3*I_N$. If this is not the case (FALSE), the process returns to the beginning (start). However, if the last measured current is greater than the specific lower limit value, e.g., $1.3*I_N$ (TRUE), the process returns back to step 420.

It should be noted that the implementation is only illustrative. For example, the queries of steps 430, 450, 470 can be easily arranged in another sequence and/or in combination with each other.

Below, the process of a device circuit breaker according to embodiments of the invention will now be compared against the behavior of a device circuit breaker according to prior art.

Figure 3:
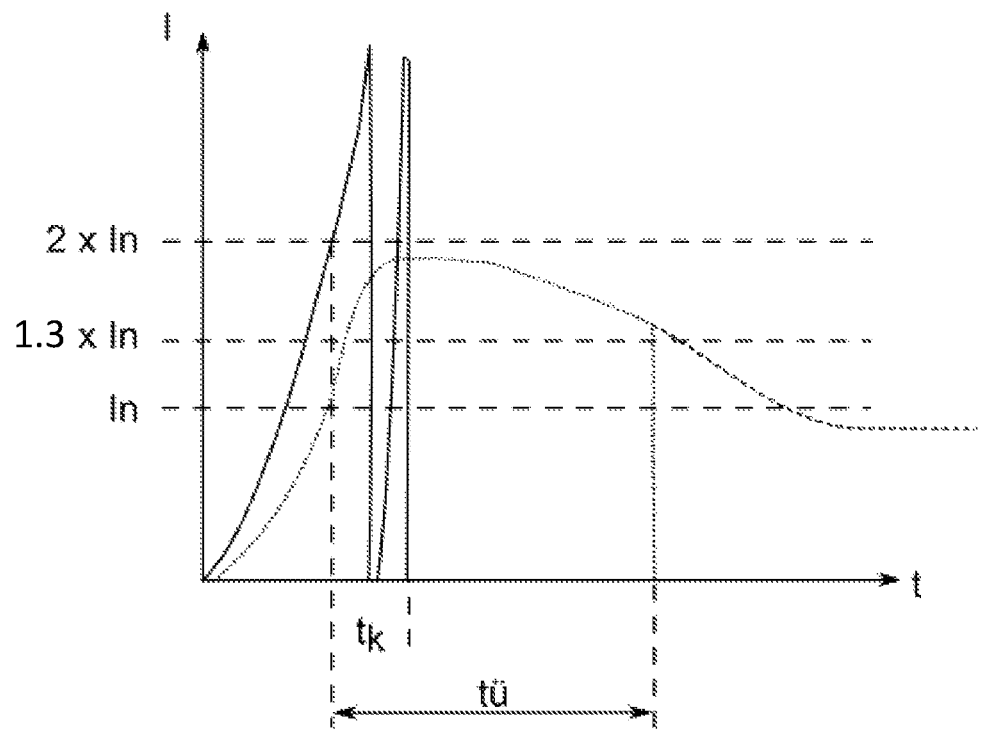
FIG. 3 shows a diagram of an illustrative current flow of a device circuit breaker according to an embodiment of the invention.

FIG. 3 shows the current flow of a device circuit breaker according to the embodiment of the invention in a first load situation and a second load situation. The first load situation is marked in the diagram as a continuous line. The second load situation is illustrated in the diagram as a dotted line.

In the first load situation, after an increase above the predetermined threshold value, e.g., double the nominal current, i.e., $2*I_N$, a first shutoff occurs followed by a restart. The current increases sharply to a value above double the nominal current, i.e., $2*I_N$. After $t_k$, the short circuit situation is detected as a result of briefly reaching the shutoff condition again and the device circuit breaker switches off permanently.

In the second load situation, a check is performed for an overload situation after reaching the lower specific limit, e.g., $1.3*I_N$. If, over a period tü after exceeding the lower specific limit, the current is still above the lower specific limit, the device circuit breaker shuts off permanently. In prior art, at least in this case, the device circuit breaker would not have been able to correctly detect the overload situation due to the higher dimensioning of the shutoff condition of $2*I_N$ and, as indicated by the dashed line, operations would instead also not have continued after to.

By contrast, in the training phase for a device circuit breaker according to the invention, a threshold value for the peak current as well as a threshold for the shutoff time would have been determined.

Figure 4:
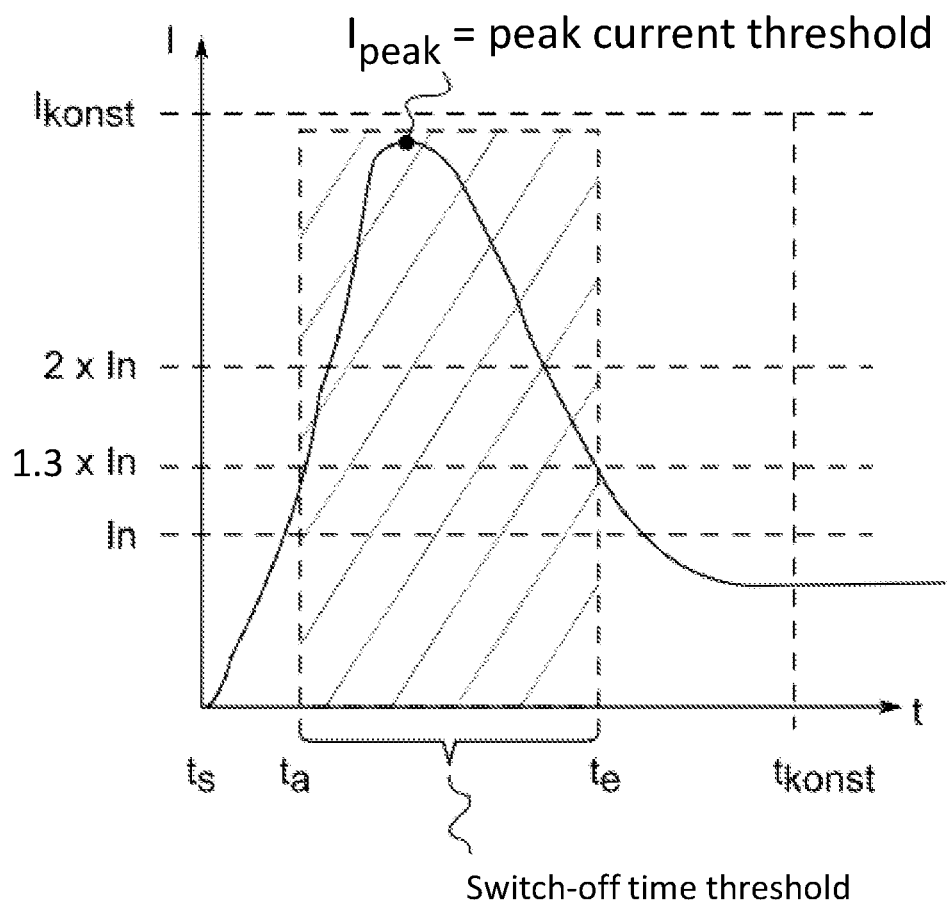
FIG. 4 shows a diagram of an illustrative current flow of a device circuit breaker according to an embodiment of the invention.
Figure 5:
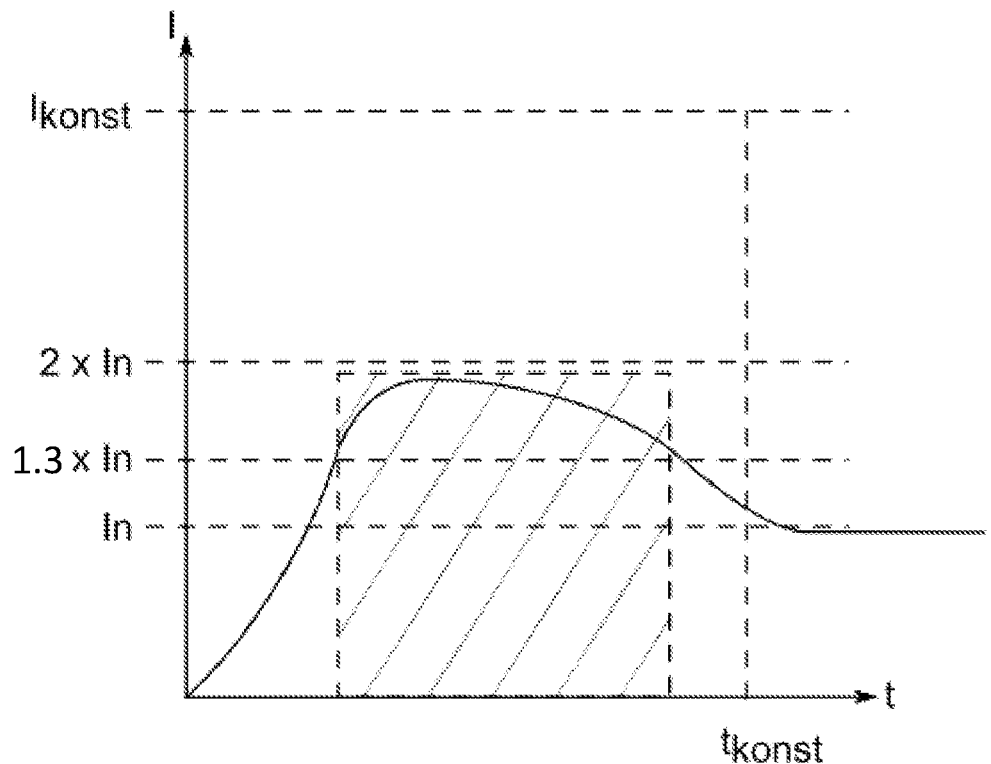
FIG. 5 shows a diagram of an illustrative current flow of a device circuit breaker according to an embodiment of the invention in accordance with a first load situation.

By means of the new device circuit breaker, it is now possible to differentiate between both situations (overload situation, short circuit situation) and to provide an appropriate switching behavior. For example, as shown in FIG. 4, the short circuit situation can be differentiated from another situation since the current does not increase above the threshold value or falls again below the lower limit value within the threshold for the shutoff time. Likewise, the absence of an overload situation can be detected since now, as shown in FIG. 5, the current falls below the specific lower limit value within the threshold for the shutoff time.

This means that by means of the novel device circuit breaker, non-critical load situations can be differentiated from critical load situations. The availability of the protected loads thus increases, since unnecessary/erroneous shutoffs are prevented, while on the other hand actual short circuit situations as well as actual overload situations can be reliably distinguished.

In another embodiment of the invention, a device circuit breaker 1 having intelligent limit value determination is also provided.

In this embodiment, the device circuit breaker 1 having intelligent limit value determination has means for determining the energy EM, means for determining the current IM through the device circuit breaker 1, means for determining the input and output voltage at the device circuit breaker and means for recording time CLK and means for adjusting the nominal tripping current. It should be noted that the different embodiments of the device circuit breakers can also be achieved in a combined form or suitable mixed forms. The corresponding means may each be utilized jointly. Even though the means for determining the energy EM are illustrated as separate from the means for determining the current IM, it is obvious to a person skilled in the art that given a current determination and known time interval, the energy can also be determined from this. To that extent, the reference to means for determining an energy is to be understood only as a reference to the interim result to be achieved.

Once again, in a training phase ($t_{train}$), the device circuit breaker 1 measures the energy that flowed to the load through the device circuit breaker 1, wherein the duration of the training phase $t_{train}$ is limited to a maximum training time $t_{konst}$.

Figure 8:
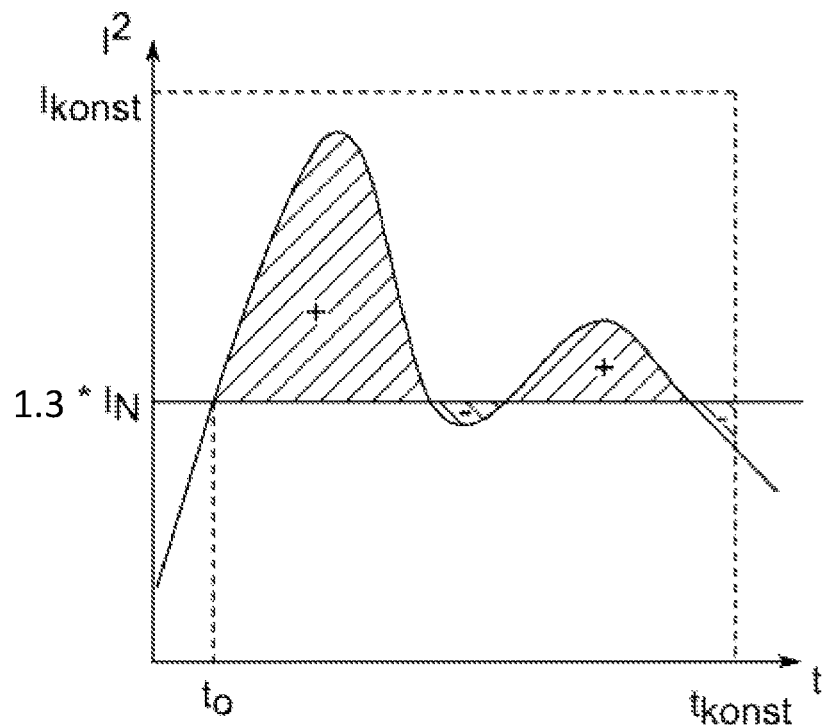
FIG. 8 shows a diagram of an illustrative energy flow of a device circuit breaker according to an embodiment of the invention in a training phase.

For example, the measurement begins as soon as the current exceeds a specific lower limit, e.g., 1.3*IN. Thereafter, the energy components (positive + as well as negative −, in relation to the lower limit) are added up; see FIG. 8. For example, this can be achieved in the following manner $$E(t_{konst} - t_0) = \sum_{i=0}^{konst} [I^2(t_i) - (1.3 * I_N)^2] * (t_i - t_{i-1})$$

After the time of the training phase $t_{konst}$ has elapsed, this is stored as a limit value $E_{verbr.train}$.

In a subsequent monitoring phase, the device circuit breaker 1 measures the present energy and totals it up to a sum value $\Sigma_E$. For example, this can be obtained as follows:

$$\sum E = E(t_n - t_0) = \sum_{t=0}^{n} [I^2(t_i) - (1.3 * I_N)^2] * (t_i - t_{i-1})$$

Figure 9:
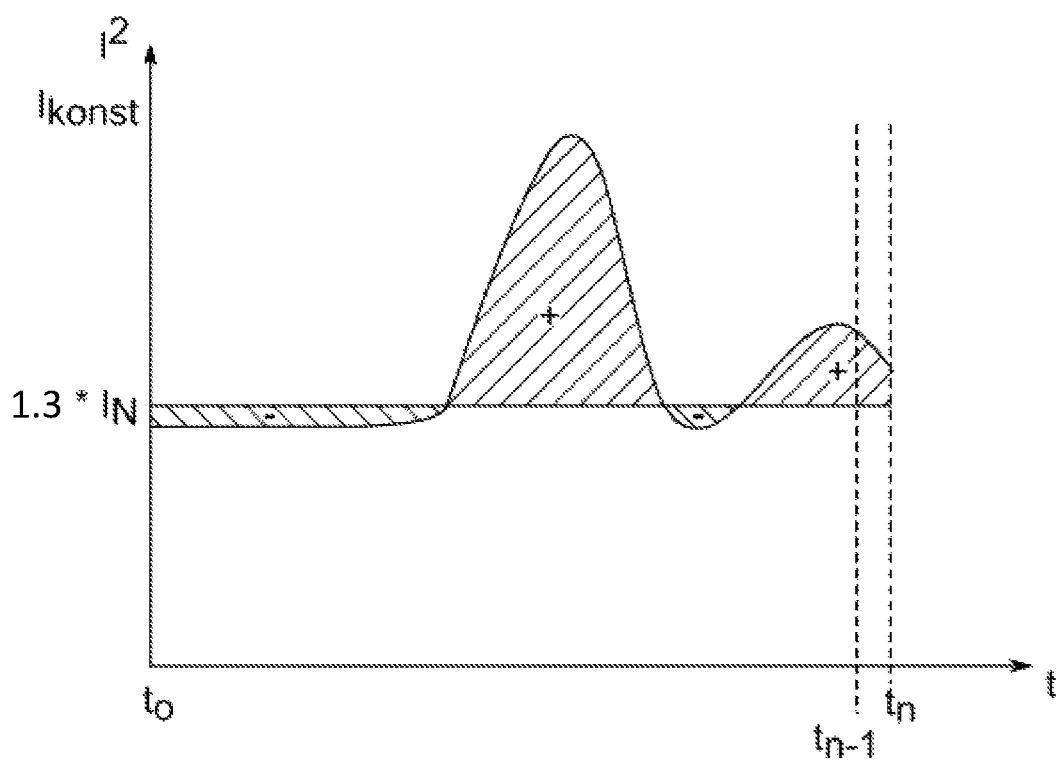
FIG. 9 shows a diagram of an illustrative energy flow of a device circuit breaker according to an embodiment of the invention in a monitoring phase.
Figure 10:
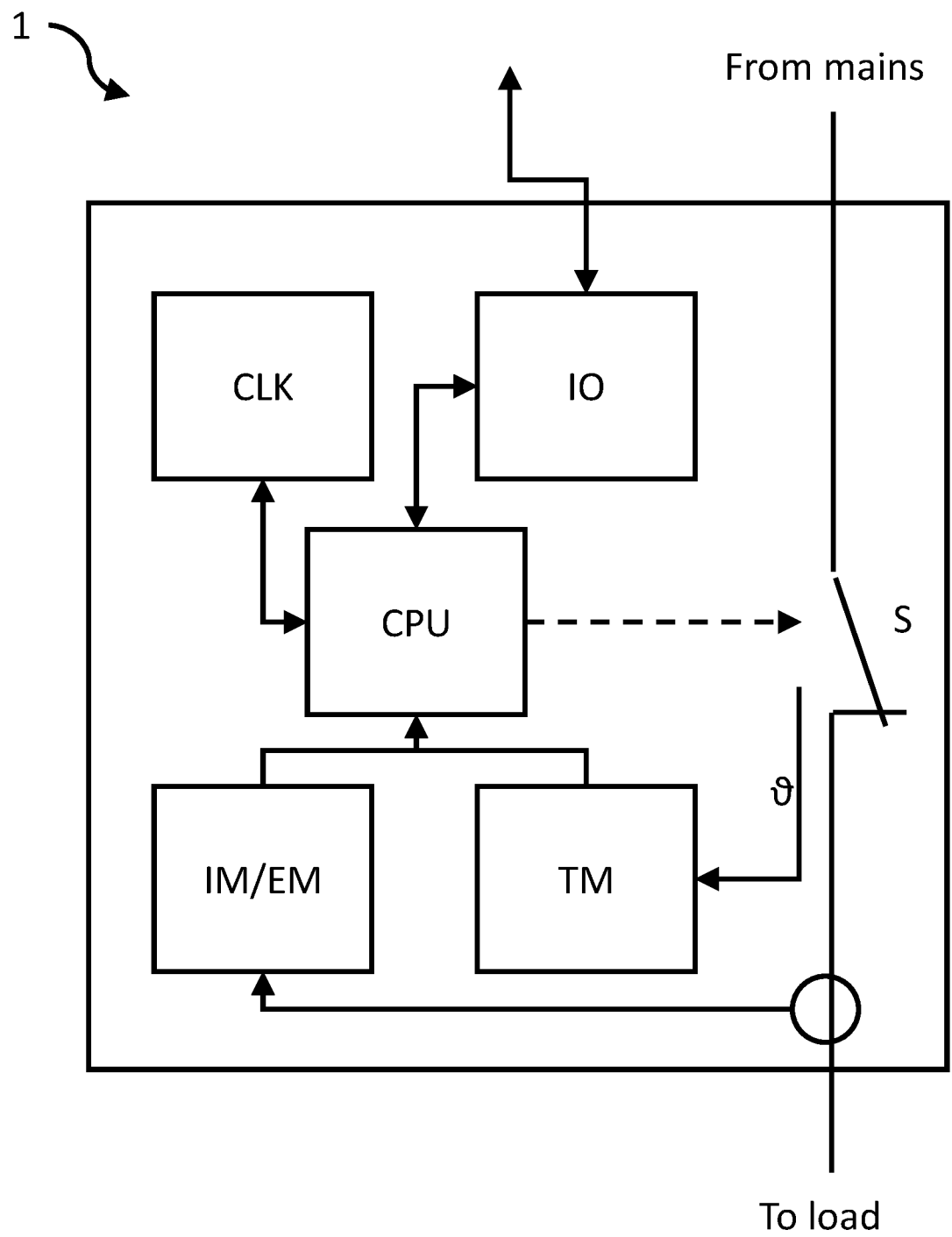
FIG. 10 shows a schematic illustration of means of a device circuit breaker according to the invention.

Only energy inputs greater than the nominal current value of the device circuit breaker 1 are taken into consideration here; see FIG. 9. This may be implemented in different ways, with the formula relationships reflecting only one possible form of the consideration.

If the added-up energy expenditures $\Sigma_E$ are greater than or equal to the energy expenditure $E_{verbr.train}$ in determined in the training phase, the device circuit breaker interrupts the current flow.

It should be noted that a rolling analysis can also be used in all embodiments, so that for a specific past interval from a respective point in time, the energy expenditure (total energy and/or energy components above the rated load) is compared to corresponding reference values from the training phase, e.g., the lower limit value.

Figure 6:
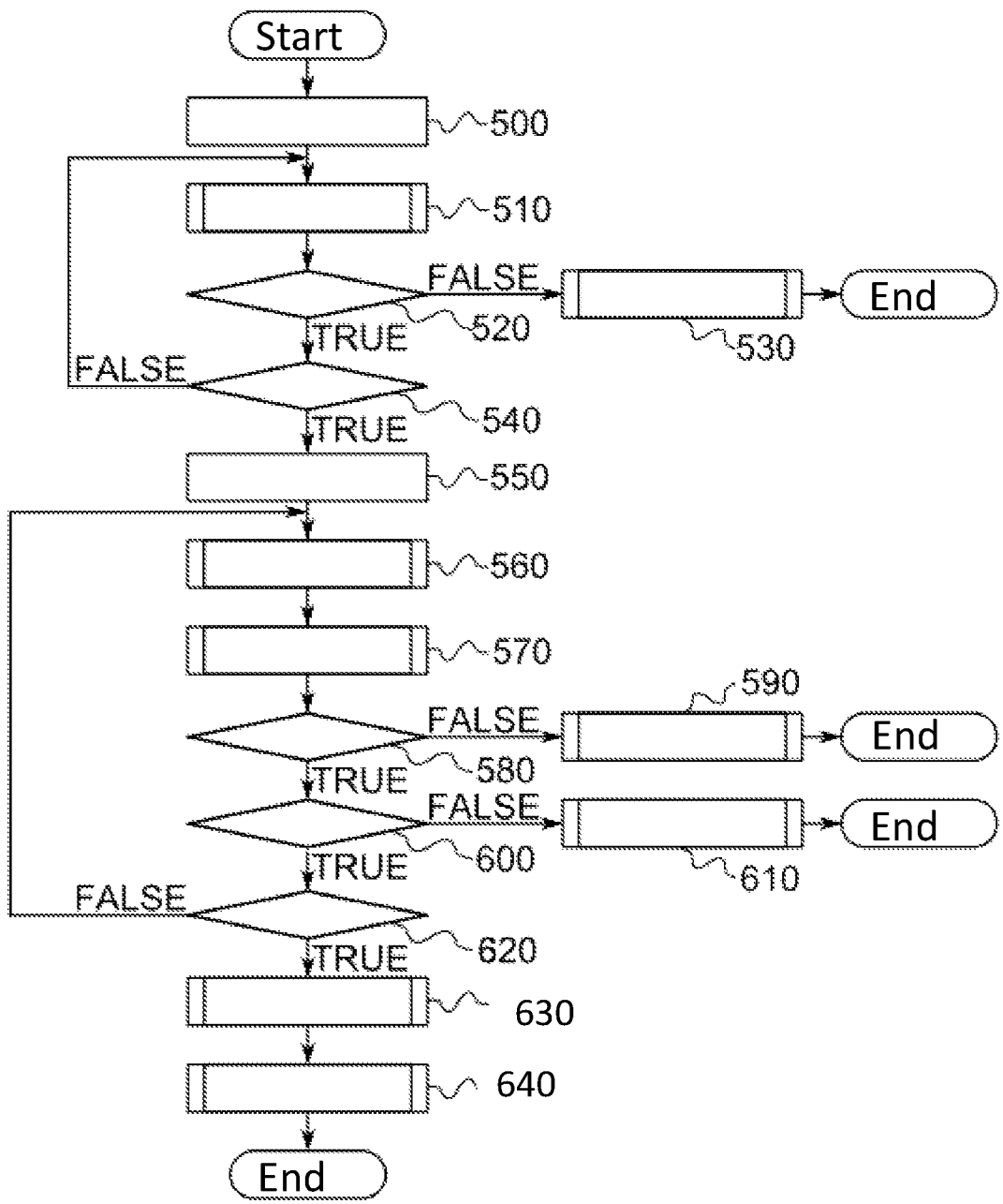
FIG. 6 shows a schematic flow chart of aspects according to another embodiment of the invention.

An illustrative process in the training phase is depicted in FIG. 6. The training phase begins at "Start." However, the training phase can also start automatically or the start can be activated manually, e.g., by pushing a button, or by a control command.

In step 500, as in step 100 earlier, a timer is once again started. In step 510, as in step 110, the start time $t_a$ is once again saved as the present counter datum/timer datum, and in step 120, the current through the device circuit breaker 1 and the time of the counter are determined. In step 520, a check is performed (as in step 130) as to whether the time of the ongoing training phase is still within the maximum training time $t_{konst}$.

If this is not the case (FALSE), the process can signal the end in an optional step 530 and thereupon end the process after the time expires. Since no higher currents were measured in the training phase, it can be assumed that the nominal current was selected incorrectly or that no load was connected. This can be signaled for example in step 530 as an error code.

If the time of the ongoing training phase still lies within the maximum training time $t_{konst}$ (TRUE), then a check is performed in step 540 (as in step 150) as to whether the current through the device circuit breaker is greater than the specific lower limit value, e.g., 1.3*$I_N$.

If this is not the case (FALSE), the process can return to step 510 and run through the additional steps again.

However, if the current through the device circuit breaker is greater than the specific lower value, e.g., 1.3*IN (TRUE), a flag can be stored in step 550 for the energy, e.g., the flag will be set to "0" because a prior energy input had not yet occurred.

In an additional step 560 (as in step 170), the current through the device circuit breaker 1 and the time of the counter are determined (again).

Based on the determined current and time values, the energy components are added up in accordance with $$E(t_{konst} - t_0) = \sum_{i=0}^{konst} [I^2(t_i) - (1.3 * I_N)^2] * (t_i - t_{i-1}).$$

In step 580 (as in step 180), a comparison is now performed as to whether the thus determined energy through the device circuit breaker is less than the flag for the maximum energy threshold (capacity threshold of the device circuit breaker). In the event that the last determined energy through the device circuit breaker is greater than the maximum energy threshold (FALSE), this can be signaled in an optional step 590 and the process can be discontinued. However, if the last determined energy through the device circuit breaker is not greater than the maximum energy threshold, a check can be performed in step 600 as to whether the measured value for the current is less than the maximum current through the device circuit breaker (as in step 230).

In a step 600, a comparison can now be performed as to whether the last determined current and/or the flag for the current peak value is less than the maximum current $I_{konst}$ through the device circuit breaker 1. If this is not the case, this can signal the end in an optional step 610 and thereby end the process by switching off the device circuit breaker. Because an excessively high current was already measured at the start of the training phase, it can be assumed that successful starting of the device circuit breaker is not possible, e.g., due to excessively low capacity of the device circuit breaker or due to a short circuit. This can be signaled for example in step 610 as an error code.

However, if the last determined current and/or the flag for the current peak value is less than the maximum current $I_{konst}$ through the device circuit breaker, the process can continue with step 620.

In step 620, a check is performed as to whether the time of the ongoing training phase lies outside of the maximum training time $t_{konst}$.

If this is not the case (FALSE), the process returns to step 560.

If the time of the ongoing training phase lies outside of the maximum training time $t_{konst}$ (TRUE), the process in the training phase enters into the final phase.

In step 630, the threshold for the energy for a subsequent monitoring phase can be assigned the value of the flag for the energy. The successful termination of the training phase can be signaled in optional step 640, with which the training process ends.

It should be noted that the implementation only serves as an example. For example, the queries can also be arranged in a different sequence and/or in combination with each other.

Figure 7:
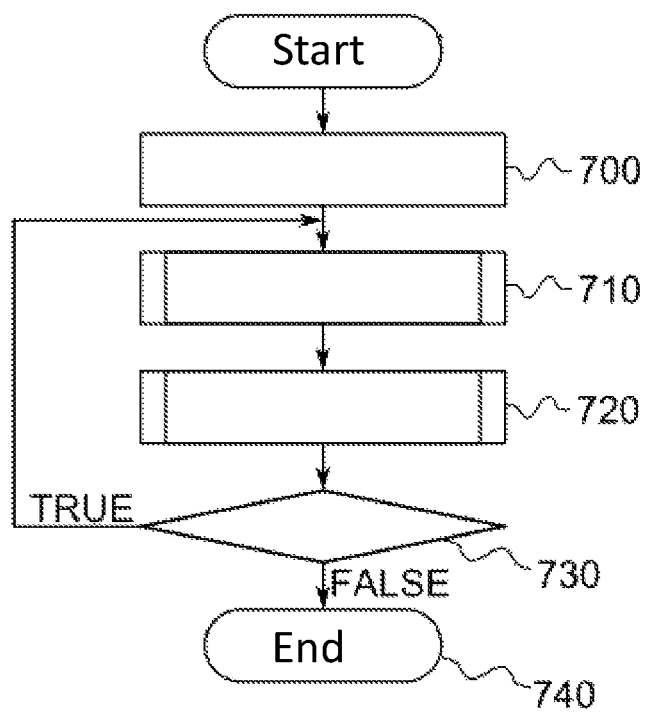
FIG. 7 shows a schematic flow chart of aspects according to another embodiment of the invention.

The monitoring phase of a thus-configured device circuit breaker 1 is illustrated in the flow diagram of FIG. 7 as an example.

The monitoring phase begins with "Start." In a first step 700, a flag for the currently summed-up energy is set to "0".

In an additional step 710 (as in step 420), the current through the device circuit breaker 1 and the time of the counter are determined (again).

By means of these figures, the flag for the energy is calculated in accordance with $$\sum E = E(t_n - t_0) = \sum_{i=0}^{n} [I^2(t_i) - (1.3 * I_N)^2] * (t_i - t_{i-1})$$

in step 720.

In a subsequent step 730, a comparison is now performed as to whether the flag for the energy is less than the energy expenditure (energy threshold) determined in the training phase. If this is the case (TRUE), the process returns to step 710. However, if the flag is not less than the energy expenditure determined in the training phase, the process ends by switching off device circuit breaker 1.

This means that in the second variant, the operating mode is also divided into a training phase and a monitoring phase. In the training phase, the energy is added up $E(t_{konst}-t_0) = \sum_{i=0}^{konst}[I^2(t_i)-(1.3*I_N)^2]*(t_i-t_{i-1})$ within a predetermined training time $t_{konst}$. A maximum current and a current integral $I^2t$ are specified as limit values. If one of the limit values is exceeded, the training process is terminated. Otherwise, the measured energy is stored as a threshold value. In the monitoring phase, the energy flow is scanned in an essentially continuous manner, wherein at the same time, the maximum permissible energy is deducted corresponding to the presently adjusted current $E(t_n-t_0)=\sum_{i=0}^{n}[I^2(t_i)-(1.3*I_N)^2]*(t_i-t_{i-1})$. The energy added up in this way is compared to the stored energy threshold of the trained load. If it is found that a limit was exceeded, then the load is turned off.

In another embodiment, it may also be provided that the added-up energy is the resulting energy. The resulting energy may be the difference between the energy inputted by the current flow and the energy outputted by the radiation/dissipation of heat energy.

The energy outputted by the radiation/dissipation of heat energy may result iteratively from the inputted energy and switch-specific parameters regarding heat dissipation, wherein a certain starting temperature is assumed.

In another embodiment, a device circuit breaker 1 having intelligent limit value determination has means for determining the energy EM, means for determining the current IM through the device circuit breaker 1 and means for recording time CLK.

In a training phase, in which the current is less than or equal to a specific upper limit value $I_{Max}$ and the energy is less than or equal to a specific upper limit value $E_{Max}$, energy expenditures ($E_{train}$) are determined, which are greater relative to a specific lower limit value (1.3 $I_N$). The training phase begins upon reaching the specific lower limit value ($I_{Max}$) of the current.

In a subsequent monitoring phase, the energy expenditures that are greater relative to a specific lower limit value (1.3 $I_N$) are added up, wherein if the added-up energy expenditures are greater than or equal to the energy expenditure ($E_{train}$) determined in the training phase, the device circuit breaker 1 interrupts the current flow, e.g., by means of the switch S.

In another embodiment of the invention, the device circuit breaker 1 having intelligent limit value determination has means for determining the energy EM, means for determining the current IM through the device circuit breaker 1, means for determining the input and output voltage at the device circuit breaker and means for recording time CLK.

In a training phase, in which the current is less than or equal to a specific upper limit value ($I_{Max}$), the device circuit breaker 1 adds up the resulting energy, wherein the resulting energy emerges as the difference between the energy inputted by the current flow and the energy outputted by the radiation/dissipation of heat energy, wherein the energy outputted by the radiation/dissipation of heat energy results iteratively from the inputted energy and switch-specific parameters relating to heat dissipation, wherein a specific starting temperature is assumed.

The training phase ends upon reaching a specific maximum training time $t_{max}$. The thus-determined resulting energy serves as a limit value $E_{train}$. This energy can also correspond to a maximum energy of the load.

In a subsequent monitoring phase, the device circuit breaker 1 adds up the resulting energy expenditures correspondingly, wherein if the resulting energy expenditures are greater than or equal to the energy expenditure $E_{train}$ determined in the training phase, the device circuit breaker interrupts the current flow, e.g., by means of a switch S.

In another embodiment, the device circuit breaker 1 according to the invention has a temperature measurement device TM for determining the temperature of the switch S, wherein the determined temperature is used as the specific starting temperature.

Alternatively or additionally, the device circuit breaker 1 can interrupt the current flow upon reaching a specific limit temperature Tmax.

In particular, it may be provided in all embodiments that the device circuit breaker 1 has a semiconductor switch S. In particular, the device circuit breaker 1 may have a MOSFET transistor as switch S.

Without limiting generality, it may be provided in all embodiments that the maximum training period $t_{max}$ can be adjusted by a user locally or remotely. Alternatively or additionally, it may be similarly provided in all embodiments that the maximum training time $t_{max}$ is predetermined specifically for a device circuit breaker as the upper limit.

According to another embodiment, a device circuit breaker 1 having intelligent limit value determination according to the invention has means for determining the current IM through the circuit breaker 1 and means for recording time CLK.

In a training phase $t_{train}$, as soon as the flowing current exceeds a first limit value (e.g., >1.3 $I_N$), the device circuit breaker 1 measures the current through the circuit breaker 1 at regular time intervals $t_{train1}, \ldots, t_{train2}, \ldots$, and stores a respective value $I_{train1}, \ldots I_{train2}, \ldots$.

The training phase ends upon reaching a specific maximum training time $t_{max}$.

In a subsequent monitoring phase, the device circuit breaker 1 monitors the current flow. If the current flow lies above a specific second limit value (e.g., 1.3 $I_N$), then starting at this point in time the current values $I_{ü1}, \ldots I_{ü2} \ldots$ are compared at regular intervals $t_{ü1} \ldots t_{ü2}, \ldots$ to the corresponding determined current values from the training phase, wherein the circuit breaker interrupts the current flow as soon as a deviation is found.

For all previously mentioned embodiments, the respective processes can naturally be adapted to other conditions. For example, the tripping behavior can be designed to be more sensitive as well as less sensitive in comparison to the behavior of circuit breakers currently available on the market, by selecting the training times or a maximum current through the device circuit breaker accordingly. For example, if the maximum current is set to the capacity limit of the device circuit breaker and the training time available for this is also set to the capacity limit of the device circuit breaker, a rather non-sensitive behavior is achieved. However, if the training time and/or the maximum current is selected to be less than the capacity limits of the device circuit breaker, then the sensitivity increases.

Without limiting generality, it may also be provided for all previously mentioned embodiments that the device circuit breaker determines the nominal current in or prior to the training phase. The thus-determined nominal current can be used for example to determine the threshold in the training phase, i.e., for 1.3 $I_N$, for example.

Likewise, in regard to all previously mentioned embodiments, the thermal equivalent circuit diagram of the electronic components of the device circuit breaker for the training process as well as the initialized accepted thermal operating behavior of the load in the monitoring mode can be taken into consideration for determining the maximum energy input.

In all previously mentioned embodiments and without limiting generality, the training phase can be started and/or ended by an external trigger, e.g., a switching element or a control command. The training phase can also be repeated.

Furthermore, without limiting generality, it may be provided for all previously mentioned embodiments that the maximum time of the training phase $t_{konst}$ is determined statically as a function of the maximum permissible peak current. In this way, one can prevent the $I^2t$ of the electronics in the device circuit breaker from being exceeded.

In addition, multiple controlled start-ups allow one to determine the maximum current value of the load and to expand the maximum time threshold accordingly, as long as the $I^2t$ is not exceeded.

It shall be noted that it can naturally be provided for all previously mentioned embodiments that the maximum peak current $I_{konst}$ and the maximum time of the training phase $t_{konst}$ may be specified as a function of the adjusted nominal current $I_N$. To enter one or more values, an input element for example may be provided on the device circuit breaker, or the device circuit breaker can be parameterized by a suitable hard-wired/wireless interface.

LIST OF REFERENCE SIGNS

1 Device circuit breaker
CLK Means for recording time
IM Means for determining the current
EM Means for determining the energy
TM Means for determining the temperature
CPU Processing unit
IO Interface
S Switch

What is claimed is:

1. A device circuit breaker having intelligent limit value determination, the device circuit breaker comprising:
   a semiconductor switch;
   a current sensor for determining current flowing through the device circuit breaker; and
   a timer for recording time,
   wherein, during a training phase, the current sensor measures how long a first current that is greater than a lower limit value flows through the device circuit breaker and a connected device, wherein the training phase ends upon reaching a maximum time, wherein a maximum current flowing through the device circuit breaker and the connected device is also determined in the training phase,
   wherein, in a monitoring phase, the current sensor monitors a second current flowing through the device circuit breaker, wherein the second current is compared to the determined maximum current, wherein upon the second current reaching or exceeding the determined maximum current and/or upon reaching or exceeding the maximum time, the device circuit breaker interrupts flow of the second current.

2. The device circuit breaker according to claim 1, wherein the training phase ends upon the first current reaching an upper limit value.

3. A device circuit breaker having intelligent limit value determination, the device circuit breaker comprising:
   a current sensor for determining current flowing through the device circuit breaker;
   a timer for recording time; and
   at least one processor to:
   in a training phase, determine an amount of energy which has flowed toward a load through the device circuit breaker during the training phase, and store the amount of energy as a limit value, wherein a duration of the training phase is limited to a maximum time; and
   in a subsequent monitoring phase, determine an amount of energy flowing toward the load through the device circuit breaker as a sum value, wherein only energy inputs greater than a nominal current value of the device circuit breaker are taken into consideration, wherein if the sum value is greater than or equal to the limit value determined in the training phase, the device circuit breaker interrupts current flow to the load.

4. The device circuit breaker according to claim 3, wherein the amount of energy determined in the training phase is resulting energy that corresponds to a difference between energy generated by current flow and energy outputted by the radiation/dissipation of heat energy, wherein the energy outputted by the radiation/dissipation of heat energy is based on the energy generated by current flow and switch-specific parameters for heat dissipation, wherein a starting temperature is assumed.

5. A device circuit breaker having intelligent limit value determination, the device circuit breaker comprising:
   a current sensor for determining current flowing through the device circuit breaker;
   a timer for recording time; and
   at least one processor to:
   place the device circuit breaker into a training phase, in which current flowing through the device circuit breaker is less than or equal to a first upper limit value and energy generated by the current flowing through the device circuit breaker is less than or equal to a second upper limit value, when the current flowing through the device circuit breaker is greater than a first lower limit value; and,
   in a subsequent monitoring phase, add up energy expenditures which are greater than a second lower limit value, wherein if the added-up energy expenditures are greater than or equal to energy expenditures determined in the training phase, the device circuit breaker interrupts current flow to a load.

6. A device circuit breaker having intelligent limit value determination, the device circuit breaker comprising:
a current sensor for determining current flowing through the device circuit breaker;
a timer for recording time; and
at least one processor to:
in a training phase in which current flowing through the device circuit breaker is less than or equal to an upper limit value, determine resulting energy as a difference between energy generated by current flow and energy outputted by radiation/dissipation of heat energy, add up the resulting energy, wherein the energy outputted by the radiation/dissipation of heat energy is determined from the energy generated by current flow and switch-specific parameters for heat dissipation, wherein a starting temperature is assumed, wherein the training phase ends upon reaching a maximum time, and wherein the added-up resulting energy serves as a limit value; and
in a subsequent monitoring phase, add up resulting energy expenditures during the monitoring phase, wherein if the resulting energy expenditures in the monitoring phase are greater than or equal to the limit value for the energy expenditure determined in the training phase, the device circuit breaker interrupts current flow to a load.

7. The device circuit breaker according to claim 5, wherein, in the monitoring phase, a rolling analysis is used so that for a past interval from a respective point in time, the added-up energy expenditures are compared to corresponding reference values determined during the training phase.

8. The device circuit breaker according to claim 1, further comprising a temperature-measuring device for determining temperature, wherein the determined temperature is used as a starting temperature.

9. The device circuit breaker according to claim 1, further comprising a temperature-measuring device for determining temperature, wherein upon reaching a limit temperature, the device circuit breaker interrupts the current flow to the connected device.

10. The device circuit breaker according to claim 1, wherein the semiconductor switch comprises a MOSFET transistor.

11. The device circuit breaker according to claim 1, wherein the maximum time is set by a user.

12. The device circuit breaker according to claim 1, wherein the maximum time is predetermined as an upper limit on a device circuit breaker-specific basis.

13. A device circuit breaker having intelligent limit value determination, the device circuit breaker comprising:
a semiconductor switch;
a current sensor for determining current flowing through the device circuit breaker; and
a timer for recording time,
wherein in a training phase, as soon as flowing current exceeds a first limit value, the current sensor measures current flow through the device circuit breaker at regular time intervals and respective measured current values are stored, wherein the training phase ends upon reaching a maximum time,
wherein in a subsequent monitoring phase, the current sensor monitors current, wherein if the current exceeds a second limit value, after that point in time current values measured in the monitoring phase are compared at regular time intervals against the corresponding measured current values from the training phase, wherein as soon as a deviation is found in the comparison, the device circuit breaker interrupts the current.

* * * * *